United States Patent [19]

Schmidlin

[11] Patent Number: 4,780,733

[45] Date of Patent: Oct. 25, 1988

[54] PRINTING APPARATUS AND TONER/DEVELOPER DELIVERY SYSTEM THEREFOR

[75] Inventor: Fred W. Schmidlin, Pittsford, N.Y.

[73] Assignee: Xerox Corporation, Stamford, Conn.

[21] Appl. No.: 140,266

[22] Filed: Dec. 31, 1987

[51] Int. Cl.[4] .......... G01D 15/00

[52] U.S. Cl. .......... 346/160.1; 346/153.1

[58] Field of Search .......... 346/155, 150, 155.1, 346/160.1, 159; 400/119; 101/DIG. 13; 355/3 DD, 3 BE

[56] References Cited

U.S. PATENT DOCUMENTS

| | | | |
|---|---|---|---|
| 3,689,935 | 9/1972 | Pressman et al. | 346/74 ES |
| 3,778,678 | 12/1973 | Masuda | 317/ |
| 3,801,869 | 4/1974 | Masuda | 317/3 |
| 3,824,924 | 7/1974 | Rarey et al. | 346/153.1 |
| 3,872,361 | 3/1975 | Masuda | 317/262 E |
| 4,448,867 | 5/1984 | Ohkubo et al. | 346/153.1 |
| 4,491,855 | 1/1985 | Fujii et al. | 346/159 |
| 4,568,955 | 2/1986 | Hosoya et al. | 346/153.1 |
| 4,647,179 | 3/1987 | Schmidlin | 355/3 DD |

*Primary Examiner*—Arthur G. Evans

[57] ABSTRACT

Direct electrostatic printing apparatus including structure for delivering developer or toner particles to a printhead forming an integral part of the printing device. The printing device includes, in addition to an apertured printhead, a conductive shoe which is suitably biased during a printing cycle to assist in the electrostatic attraction of developer through apertures in the printhead onto the copying medium disposed intermediate the printhead and the conductive shoe. Developer or toner is delivered to the printhead via a pair of opposed charged toner or developer conveyors. One of the conveyors is attached to the printhead and has an opening therethrough for permitting passage of the developer or toner from between the conveyors to areas adjacent the apertures in the printhead.

12 Claims, 1 Drawing Sheet

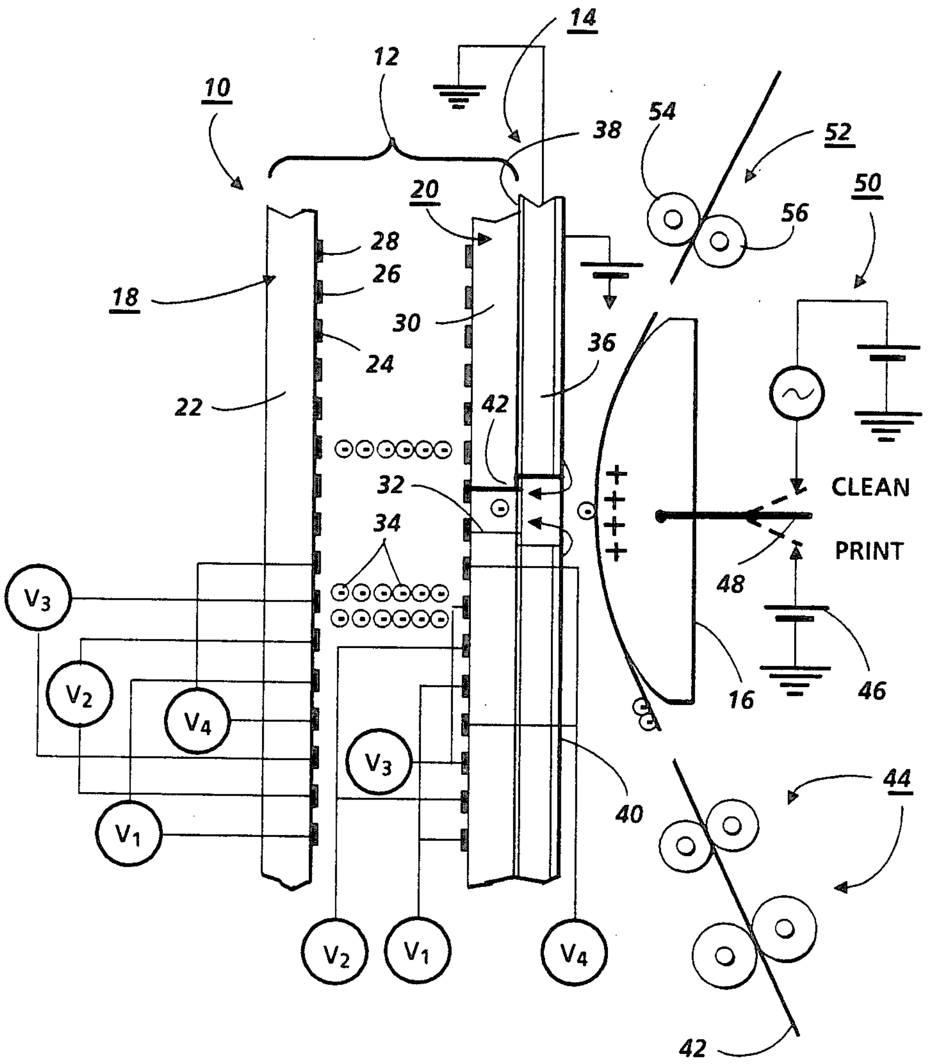
10
12
14
38
54
52
20
56
50
28
26
18
30
36
24
22
42
CLEAN
32
34
PRINT
48
V3
V2
V4
16
46
V3
V1
40
44
V2
V1
V4
42

PRINTING APPARATUS AND TONER/DEVELOPER DELIVERY SYSTEM THEREFOR

BACKGROUND OF THE INVENTION

This invention relates to electrostatic printing devices and more particularly to a developer or toner delivery system for presenting developer or toner to an electronically addressable printhead utilized for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al, discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955, issued on Feb. 4, 1986 to Hosoya et al, discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

The toner carrying plate of Hosoya et al is made of an insulator. The toner carrying plate has a horizontal portion, a vertical portion descending from the right end of the horizontal portion and an inclined portion downwardly inclining from the left end of the horitontal portion. The lower end of the inclined portion is found near the lower end of the inclined bottom of the toner reservoir and immersed in the toner therein. The lower end of the vertical portion is found near the upper end of the inclined portion and above the toner in the reservoir.

The surface of the toner carrying plate is provided with a plurality of uniformly spaced parallel linear electrodes extending in the width direction of the toner carrying plate. At least three AC voltages of different phases are applied to the electrodes. The three-phase AC voltage source provides three-phase AC voltages 120 degrees out of phase from one another. The terminals are connected to the electrodes in such a manner that when the three-phase AC voltages are applied a propagating alternating electric field is generated which propagates along the surface of the toner carrying plate from the inclined portion to the horizontal portion.

The toner which is always present on the surface of lower end of the inclined portion of the toner carrying plate is negatively charged by friction with the surface of the toner carrying plate and by the agitator. When the propagating alternating electric field is generated by the three-phase AC voltages applied to the electrodes, the toner is allegedly transported up the inclined portion of the toner carrying plate while it is oscillated and liberated to be rendered into the form of smoke between adjacent linear electrodes. Eventually, it reaches the horizontal portion and proceeds therealong. When it reaches a development zone facing the recording electrode it is supplied through the opening to the ordinary sheet as recording medium, whereby a visible image is formed. The toner which has not contributed to the formation of the visible image is carried along such as to fall along the vertical portion and then slide down into the bottom of the toner reservoir by the gravitational force to return to a zone, in which the lower end of the inclined portion of the toner carrying plate is found.

U.S. Pat. No. 4,647,179, granted to Fred W. Schmidlin on Mar. 3, 1987, discloses a toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

U.S. Pat. No. 3,872,361, issued to Masuda, discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are connected with different terminals in a regular sequence, producing a wave-like, nonuniform electric field that repels electrically charged particles axially inwardly and tends to propel them along the path.

U.S. Pat. No. 3,778,678, also issued to Masuda, relates to a similar device as that disclosed in the aforementioned '361 patent.

U.S. Pat. No. 3,801,869, issued to Masuda, discloses a booth in which electrically charged particulate material is sprayed onto a workpiece having an opposite charge, so that the particles are electrostatically attracted to the workpiece. All of the walls that confront the workpiece are made of electrically insulating material. A grid-like arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic or electrodynamic printing.

The Masuda devices all utilize a relatively high voltage source (i.e. 5-10 KV) operated at a relatively low frequency, i.e. 50 Hz, for generating his travelling waves. In a confined area such as a tube for between parallel plates the use of high voltages is tolerable and in the case of the '869 patent even necessary since a high voltage is required to charge the initially uncharged particles.

In U.S. patent application Ser. No. 374,376, now abandoned, and its foreign counterpart filed in Japan on May 7, 1981 there is disclosed a device comprising an elongated conduit which utilizes travelling waves for transporting toner from a supply bottle to a toner hopper.

U.S. patent application Ser. No. 946,937, filed in the name of Schmidlin et al and assigned to the same assignee as the instant invention, discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '937 application, a single charged toner conveyor is supplied by a pair of three-phase generators which are biased by a dc source which causes toner of one polarity to travel in one direction on the electrode array while toner of the opposite polarity travels generally in the opposite direction.

In an additional embodiment disclosed in the '937 application, a toner charging device is provided which charges uncharged toner particles to a level sufficient for movement by one or the other of the aforementioned charged toner conveyors.

The toner in a device such as disclosed in the '937 application is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

BRIEF DESCRIPTION OF THE INVENTION

I have discovered that extraction of toner from the clouds of toner conveyed by the charged toner conveyor by the fringe fields around the apertures can be enhanced by passing the toner intermediate two charged toner conveyors and providing an open area through one of them for passage of toner conveyed between the conveyors in the direction of the printhead, the open area being provided between adjacent electrodes. Alternatively, instead of the toner passing between adjacent electrodes, an electrode opposite the open area could be omitted to permit travel of toner through the open area without inhibiting conveyor action.

One of the charged toner conveyors is preferably attached to the printhead thereby forming a unitary structure therewith.

DETAILED DESCRIPTION OF THE DRAWINGS

The FIGURE is a schematic illustration of a printing apparatus representing the present invention.

DESCRIPTION OF THE PREFERRED EMBODIMENT OF THE INVENTION

Disclosed in the FIGURE is an embodiment of a direct electrostatic printing apparatus 10 representing the invention.

The printing apparatus 10 includes a developer delivery or conveying system generally indicated by reference character 12, a printhead structure 14 and a backing electrode or shoe 16.

The developer delivery system 12 includes a pair of charged toner conveyors (CTC) 18 and 20. The charged toner conveyor 18 comprises a base member 22 and an electrode array comprising repeating sets of electrodes 24, 26 and 28 to which are connected A.C. voltage sources $V_1$, $V_2$ $V_3$ and $V_4$ which voltages are phase shifted one from the other so that an electrostatic travelling wave pattern is established. The charged toner conveyor 20 comprises a base member 30 and repeating sets of electrodes 24, 26 and 28. The base member 30 is similar in construction to the member 22 with the exception that an open area 32 is provided therein. The charged toner conveyor 20 also provides an electrostatic travelling wave pattern in the same manner as the conveyor 18.

The effect of the travelling wave patterns established by the conveyors 18 and 20 is to cause already charged toner particles 34 introduced into the area intermediate the two conveyors to travel therebetween under the combined influence of the two wave patterns until the toner particles 34 reach the open area 32 where they come under the influence of electrostatic fringe fields emanating from the printhead 14 and voltage applied to the shoe 16. The combined effect of the two wave patterns is to enhance extraction of toner from the clouds of toner conveyed by the charged toner conveyors by the fringe fields of the printhead structure.

By way of example, the developer comprises any suitable insulative non-magnetic toner/carrier combination having Aerosil (Trademark of Degussa, Inc.) contained therein in an amount approximately equal to 0.3 to 0.5% by weight and also having zinc stearate contained therein in an amount approximately equal to 0.1 to 0.3% by weight.

The printhead structure 14 comprises a layered member including an electrically insulative base member 36 fabricated from a polyimide film approximately 0.001 inch thick. The base member is clad on the one side thereof with a continuous conductive layer or shield 38 of aluminum which is approximately one micron thick. The opposite side of the base member 36 carries segmented conductive layer 40 thereon which is fabricated from aluminum. A plurality of holes or apertures 42 (only one of which is shown) approximately 0.007 inch in diameter are provided in the layered structure in pattern suitable for use in recording information. The apertures form an electrode array of individually addressable electrodes. With the shield grounded and with 0–100 volts applied to an addressable electrode, toner is propelled through the aperture associated with that electrode. The aperture extends through the base 36 and the conductive layers 38 and 40.

With a negative 350 volts applied to an addressable electrode toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 42 from the printhead 14 supports the recording medium in an arcuate path in order to provide an extended area of contact between the medium and the shoe.

The recording medium 42 may comprise roll paper or cut sheets of paper fed from a supply tray, not shown. The sheets of paper are spaced from the printhead 14 a distance in the order of 0.005 to 0.030 inch as they pass therebetween. The sheets 42 are transported in contact with the shoe 16 via edge transport roll pairs 44.

During printing the shoe 16 is electrically biased to a dc potential of approximately 400 volts via a dc voltage source 46.

Periodically, a switch 48 is actuated in the absence of a sheet of paper between the printhead and the shoe such that a dc biased AC power supply 50 is connected to the the shoe 16 to effect cleaning of the printhead. The voltage from the source 50 is supplied at a frequency which causes the toner in the gap between the paper and the printhead to oscillate and bombard the printhead.

Momentum transfer between the oscillating toner and any toner on the control electrodes of the printhead causes the toner on the control electrodes to become dislodged. The toner so dislodged is deposited on the substrates subsequently passed over the shoe 16.

At the fusing station, a fuser assembly, indicated generally by the reference numeral 52, permanently affixes the transferred toner powder images to sheet 42. Preferably, fuser assembly 52 includes a heated fuser roller 54 adapted to be pressure engaged with a back-up roller 56 with the toner powder images contacting fuser roller 54. In this manner, the toner powder image is permanently affixed to copy substrate 42. After fusing, a chute, not shown, guides the advancing sheet 42 to catch tray, also not shown, for removal from the printing machine by the operator.

A typical width for each of the electrodes for the travelling wave grid is 1 to 4 mils. Typical spacing between the centers of the electrodes is twice the electrode width and the spacing between adjacent electrodes is approximately the same as the electrode width. Typical operating frequency is between 1000 and 10,000 Hz for 125 lpi grids (4 mil electrodes), the drive frequency for maximum transport rate being 2,000 Hz.

A typical operating voltage is relatively low (i.e. less than the Paschen breakdown value) and is in the range of 30 to 1000 depending on grid size, a typical value being approximately 500 V for a 125 lpi grid. Stated differently, the desired operating voltage is approximately equal to 100 times the spacing between centers of adjacent electrodes.

While the electrodes may be exposed metal such as Cu or Al it is preferred that they be covered or overcoated with a thin oxide or insulator layer. A thin coating having a thickness of about half of the electrode width will sufficiently attenuate the high harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred covercoating layer comprises a strongly injecting active matrix such as the disclosed in U.S. Pat. No. 4,515,882, granted in the name of Joseph Mammino et al on or about May 7, 1985 and assigned to the same assignee as the instant application. As disclosed therein, the layer comprises an insulating film forming continuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

What is claimed is:

1. Image forming apparatus including a toner delivery system for transporting toner particles from a supply to an area where they are utilized for forming visible images on a substrate, the improvement comprising:

a toner deliver system including a pair of travelling wave toner transports disposed in opposed relation to each other, one of said transports being supported contiguous a substrate;

said one of said transports having having at least one opening therethrough to allow movement of toner from between said transports to said substrate.

2. Apparatus according to claim 1 including an apertured printhead structure disposed between said one of said transports and said substrate for controlling the configuration of the images formed on said substrate.

3. Apparatus according to claim 2 wherein said substrate comprises plain paper.

4. Apparatus according to claim 3 wherein said one of said transports is carried by said printhead structure.

5. Apparatus according to claim 4 wherein each of said transports comprises:

a linear electrode array carried on the outer surface of a base member, said array comprising a plurality of spaced apart electrodes extending substantially transverse to the direction of movement of toner particles; and a source of a.c. multi-phase voltage operatively connected to said electrode array, the phases the voltages being shifted with respect to each other such as to create atravelling electrostatic wave pattern capable of moving toner particles from a supply to said an area adjacent said opening.

6. Apparatus according to claim 5 wherein the spacing between centers of said electrodes is in the order of 2–10 mils.

7. Apparatus according to claim 6 wherein the width of each electrode is in the order of 1–5 mils.

8. Apparatus according to claim 7 wherein said a.c. voltage is relatively low.

9. Apparatus according to claim 8 wherein said voltage is less than 100 times the spacing between centers of adjacent electrodes.

10. Apparatus according to claim 9 wherein said voltage is operated at a frequency of approximately 1000 Hz or greater.

11. Apparatus according to claim 10 wherein the spacing between electrodes is approximately equal to the width thereof.

12. Apparatus according to claim 1 wherein said electrodes are coplanar.

* * * * *